(12) United States Patent
Wood et al.

(10) Patent No.: US 10,331,418 B2
(45) Date of Patent: Jun. 25, 2019

(54) STATE MACHINE REPRESENTATION OF A DEVELOPMENT ENVIRONMENT DEPLOYMENT PROCESS

(71) Applicant: PAYPAL, INC., San Jose, CA (US)

(72) Inventors: Trevor Wood, Austin, TX (US); Jason Deleau, Austin, TX (US)

(73) Assignee: PayPal, Inc., San Jose, CA (US)

(*) Notice: Subject to any disclaimer, the term of this patent is extended or adjusted under 35 U.S.C. 154(b) by 140 days.

(21) Appl. No.: 14/962,499

(22) Filed: Dec. 8, 2015

(65) Prior Publication Data

US 2017/0161028 A1 Jun. 8, 2017

(51) Int. Cl.
G06F 9/44 (2018.01)
G06F 8/34 (2018.01)
G06F 8/60 (2018.01)
G06F 8/71 (2018.01)

(52) U.S. Cl.
CPC ............... *G06F 8/34* (2013.01); *G06F 8/60* (2013.01); *G06F 8/71* (2013.01)

(58) Field of Classification Search
None
See application file for complete search history.

(56) References Cited

U.S. PATENT DOCUMENTS

| | | | |
|---|---|---|---|
| 7,139,999 B2* | 11/2006 | Bowman-Amuah | G06Q 10/06 717/100 |
| 9,043,786 B1* | 5/2015 | Hodge | G06F 9/45558 717/171 |
| 9,128,472 B2* | 9/2015 | Lawson | G05B 19/4185 |
| 2002/0184610 A1* | 12/2002 | Chong | G06F 8/30 717/106 |
| 2004/0225650 A1* | 11/2004 | Cooper | H04M 3/527 |
| 2005/0021756 A1* | 1/2005 | Grant | G06Q 30/02 709/226 |
| 2005/0257194 A1* | 11/2005 | Morrow | G06F 8/34 717/109 |
| 2008/0295011 A1* | 11/2008 | Bhogal | G06F 3/0481 715/765 |
| 2008/0320441 A1* | 12/2008 | Ahadian | G06F 8/24 717/108 |
| 2009/0006987 A1* | 1/2009 | Simhi | G06F 8/24 715/762 |
| 2010/0031247 A1* | 2/2010 | Arnold | G06F 8/61 717/174 |
| 2010/0153529 A1* | 6/2010 | Moser | H04L 41/5038 709/223 |

(Continued)

*Primary Examiner* — Insun Kang
(74) *Attorney, Agent, or Firm* — Haynes and Boone, LLP

(57) ABSTRACT

Systems and methods for graphically representing a deployment process of a development environment are described. A request to create a development environment is received from a user. The request is evaluated to identify a stored template appropriate for the requested development environment, and the identified stored template is parsed to identify a plurality of executable instructions. A graphical depiction of the executable instructions is generated for display on a display device coupled to a development environment deployment system. Upon receipt of an updated status of an executable instruction from a virtual machine host coupled to the development environment deployment system, the graphical depiction of the executable instructions is modified.

20 Claims, 4 Drawing Sheets

(56) References Cited

U.S. PATENT DOCUMENTS

| | | | |
|---|---|---|---|
| 2010/0287525 A1* | 11/2010 | Wagner | G06F 8/20 717/100 |
| 2011/0185346 A1* | 7/2011 | Andrade | G06F 8/60 717/151 |
| 2012/0324420 A1* | 12/2012 | Collinson | G05B 17/02 717/105 |
| 2013/0152072 A1* | 6/2013 | Fernandez-Ruiz | G06F 8/60 717/175 |
| 2014/0047413 A1* | 2/2014 | Sheive | H04L 65/403 717/110 |
| 2014/0068546 A1* | 3/2014 | Balasubramanian | G06F 8/61 717/104 |
| 2014/0089901 A1* | 3/2014 | Hadar | G06F 17/3089 717/127 |
| 2014/0289702 A1* | 9/2014 | McMahon | G06F 21/60 717/120 |
| 2015/0135163 A1* | 5/2015 | Mun | G06F 8/71 717/120 |
| 2015/0205602 A1* | 7/2015 | Prismon | G06F 8/71 717/121 |
| 2015/0378716 A1* | 12/2015 | Singh | G06F 8/65 717/172 |
| 2016/0092179 A1* | 3/2016 | Straub | G06F 8/71 717/107 |
| 2016/0092414 A1* | 3/2016 | Kalyanasundaram | G06F 8/33 715/234 |
| 2016/0098254 A1* | 4/2016 | Paternostro | G06F 8/35 717/105 |
| 2016/0124722 A1* | 5/2016 | Mathew | G06F 8/51 717/136 |
| 2016/0154629 A1* | 6/2016 | Noens | G06F 8/30 717/107 |
| 2016/0378437 A1* | 12/2016 | Patino-Bueno | G06F 8/20 717/105 |
| 2017/0017634 A1* | 1/2017 | Levine | G06F 17/248 |
| 2017/0083292 A1* | 3/2017 | McLaughlan | G06F 8/34 |
| 2017/0102925 A1* | 4/2017 | Ali | G06F 8/36 |
| 2017/0139695 A1* | 5/2017 | Govindaraju | G06F 8/60 |

* cited by examiner

STATE MACHINE REPRESENTATION OF A DEVELOPMENT ENVIRONMENT DEPLOYMENT PROCESS

BACKGROUND

Field of the Invention

The present disclosure generally relates to software development, and more particularly, to a method and system for deploying development environments upon which to test and develop software applications.

Related Art

Software applications, and particularly, software applications utilized by large businesses and other organizations, which may require high availability and responsiveness, are often developed and tested in environments which closely emulate the environments in which these software applications will be eventually deployed in production. Thus, for example, a development environment for a web-based application may include a web server, one or more database servers, application frameworks, and other components, to emulate a real-world situation in which the application will eventually be deployed.

Creating and managing development environments, however, can be a tedious process. Some steps, or indeed the entire process, may be performed manually. Even when some portions are automated, certain steps may require manual intervention, and errors occur frequently and must be remedied. Organizations may assign administration of development environments to certain employees, but if development occurs rapidly and often within the organization, setting up new development environments or activating changes to existing development environments are bottlenecked by limited resources. Until a development environment is provisioned, a developer cannot start working on a given application.

Thus, there is a need for an improved method and system for deploying development environments.

Figure 1:
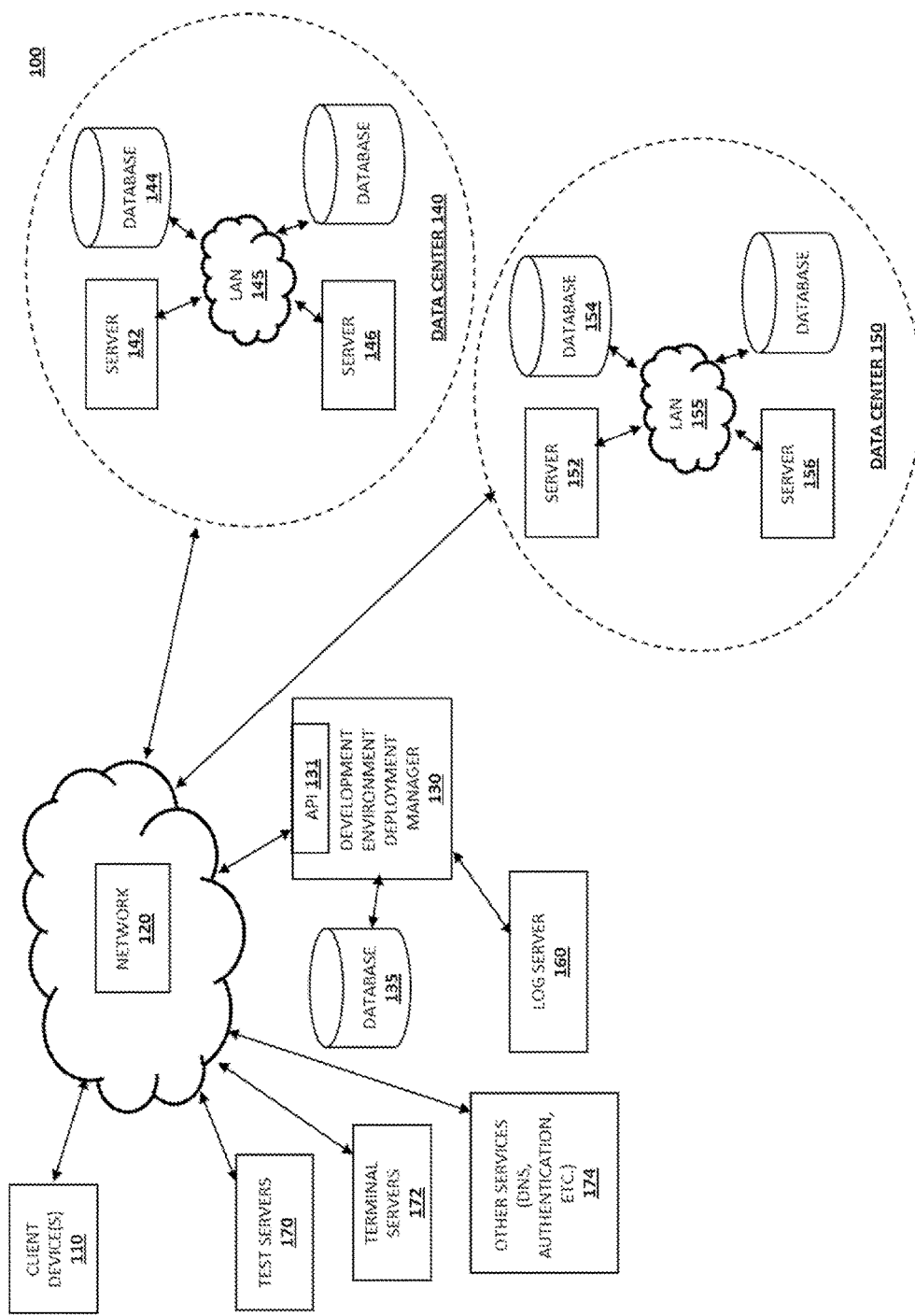
FIG. 1 is a schematic view illustrating an embodiment of a networked system.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides systems and methods for deploying development environments for software developers. Development environments may emulate aspects of a production computing system for testing new software packages in development to ensure that those in-development software packages operate largely free of bugs and errors, and perform with characteristics desired by the organizations employing those software packages. In one embodiment, a plurality of templates for creating a development environment are stored on a development environment deployment system or a database connected thereto. Upon a request from a user to create a development environment, the request is evaluated to identify a stored template appropriate for the requested development environment. For example, specifics of the request may indicate software packages and versions of those software packages to be installed so that the development environment approximates a representation of a production system. Thus, a system as described herein may select an appropriate template having those software packages and versions. Based on the template, an instruction sequence is generated to create the requested development environment, and instructions in the sequence are transmitted to a plurality of virtual machine hosts or hypervisors for execution. Upon successful creation of the development environment, access information for the development environment is returned to the requesting user.

Referring now to FIG. 1, an embodiment of a networked system 100 is illustrated. The networked system 100 includes one or more client devices 110 that are coupled to a network 120. A development environment deployment manager 130 is coupled to the network 120. Also coupled to network 120 are multiple other devices. For example, servers 142 and 146, which may be part of a first data center 140, may be connected to network 120. In one embodiment, the servers 142 and 146 may be a particular type of virtual machine host servers or hypervisors, such as OpenStack servers configured to host OpenStack virtual machines. The data center 140 may further include a local area network 145 coupling each of servers 142 and 146. Network 120 may also be connected to servers 152 and 156, which may be part of a second data center 150. In one embodiment, the servers 152 and 156 may be a second type of virtual machine host servers or hypervisors, such as VMWARE servers configured to host VMWARE virtual machines. Data center 150 may also include a local area network 155 coupling each of servers 152 and 156.

In the embodiments discussed below, development environment deployment manager 130 may be used by a payment service provider or other entity to create and deploy development environments for various applications, such as one or more payment service provider applications, including checkout application, money sending application, and/or other payment service provider applications. Other applications may include back-end or back-office type applications, such as web server software, mobile-device applications, and other applications. As such, the development environment deployment manager 130 may deploy development environments in each of data centers 140 and 150 using the servers 142, 146, 152, and 156. In one embodiment, the development environment deployment manager 130 receives requests via an application programming interface (API) 131, as will be described further herein. Thus, in the present disclosure, references to development environment deployment manager 130 receiving requests and providing responses should be understood as also referring to API 131. One of skill in the art in possession of the present disclosure will recognize that the systems and methods of the present disclosure will be beneficial to a wide variety of applications provided by a wide variety of different system providers. As such, while specific references are made to a payment service provider providing the systems and methods of the present disclosure, any system provider utilizing the teachings of the present disclosure to deploy development environments is envisioned as falling within the scope of the present disclosure.

The client devices, development environment deployment manager 130, servers 142, 146, 152, and 156, log server 160, test server 170, terminal servers 172, and other services 174 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 100, and/or accessible over the network 120.

The client devices 110 may be implemented using any appropriate combination of hardware and/or software configured for wired and/or wireless communication over network 120. For example, in one embodiment, the client devices 110 may be implemented as a personal computer of a user in communication with the Internet. In other embodiments, the client devices 110 may be a smart phone, laptop computer, wearable computing device, and/or other types of computing devices.

The client devices 110 may include one or more browser applications which may be used, for example, to provide a convenient interface to permit users to browse information available over the network 120. For example, in one embodiment, the browser application may be implemented as a web browser configured to view information available over the Internet.

The client devices 110 may also include one or more toolbar applications which may be used, for example, to provide user-side processing for performing desired tasks in response to operations selected by the user. In one embodiment, the toolbar application may display a user interface in connection with the browser application.

The client devices 110 may further include other applications as may be desired in particular embodiments to provide desired features to the client devices 110. The other applications may also include security applications for implementing user-side security features, programmatic user applications for interfacing with appropriate application programming interfaces (APIs) over the network 120, or other types of applications. Email and/or text applications may also be included, which allow the user to send and receive emails and/or text messages through the network 120. The client device 110 include one or more user and/or device identifiers which may be implemented, for example, as operating system registry entries, cookies associated with the browser application, identifiers associated with hardware of the client device 110, or other appropriate identifiers, such as a phone number.

The network 120 may be implemented as a single network or a combination of multiple networks. For example, in various embodiments, the network 120 may include the Internet and/or one or more intranets, landline networks, local area networks, wide area networks, wireless networks, and/or other appropriate types of networks.

The development environment deployment manager 130 may be coupled to a database 135. In some embodiments, as described further herein, the database 135 stores one or more templates for development environments which can be used by development environment deployment manager 130 to create a development environment.

Development environment deployment manager 130 may also be coupled to a logging server 160. In one embodiment, as shown, development environment deployment manager 130 is coupled directly to logging server 160. In some embodiments, development environment deployment manager 130 may be coupled to logging server 160 using network 120, or logging server 160 may be part of development environment deployment manager 130. Logging server 160 may log various events for development environment deployment manager 130, such as successful steps in a deployment processor, or errors and other failures during a deployment process.

Also coupled to network 120 may be one or more test servers 170 used to test applications developed on development environments deployed by development environment deployment manager 130. Additionally, coupled to network 120 may be one or more terminal servers 172 and servers for other services 174, such as a domain name server (DNS) or an authentication server.

As described above, the process of deploying a development environment for applications being developed by a business or other entity is complex, and involves multiple steps or events, each of which may encounter failures. Accordingly, such a process may ordinarily require extensive manual involvement. Embodiments described herein automate aspects of the deployment process using templates for development environments, and using error handling for deploying development environments. In one embodiment, after a development environment is successfully deployed and set up, virtual machines and other components used in that development environment are selectively cloned, and instructions and execution sequences are used from the successful deployment to create a template for future development environments.

Figure 2:
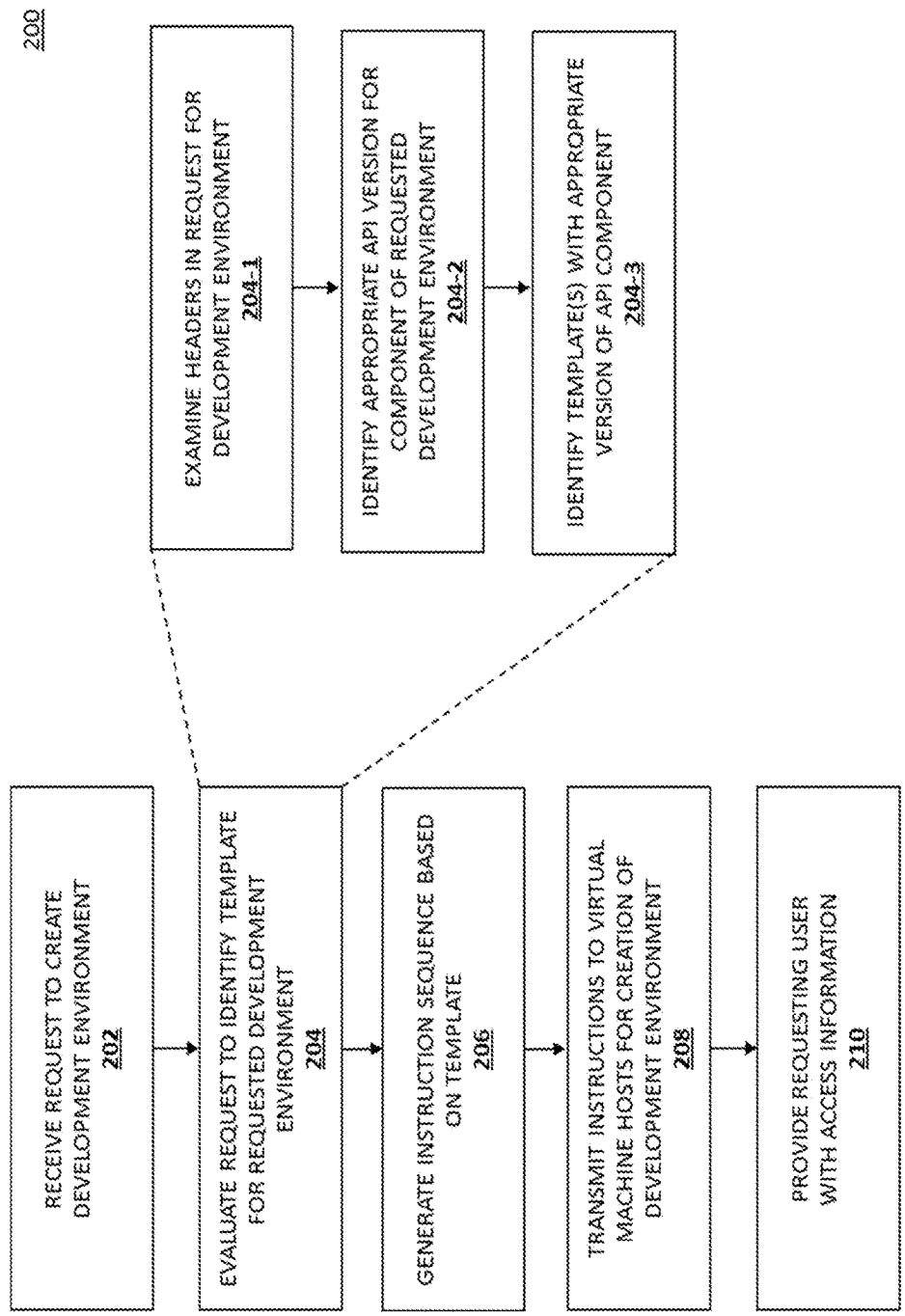
FIG. 2 is a flow chart illustrating an embodiment of a method for deploying a development environment.

Referring now to FIG. 2, an embodiment of a method 200 for deploying a development environment is illustrated. In the embodiments and examples discussed below, the development environment is referred to as a development environment for a data analysis application. However, other applications are also possible, including payment applications such as checkout applications, donate money to charity applications, and/or a wide variety of other types of payment applications known in the art. Furthermore, as discussed above, a wide variety of non-payment applications will benefit from the teachings of the present disclosure and are envisioned as falling within its scope. Such applications may be provided by a payment provider service or other system provider, and/or may include other applications that require development environments.

The method 200 begins at block 202 where a request to create a development environment is received from a user. In one embodiment, the request is formatted in an extensible markup language (XML). In one embodiment, the request is a JAVASCRIPT object notation formatted request (JSON). In one embodiment, the development environment deployment manager 130 receives requests from users via an API 131 exposed to requesting users. The API may be a representation state transfer (REST or RESTful) API. Requests may be transmitted over the hypertext transfer protocol (HTTP) and, as explained above, may be formatted as JSON or XML requests. In one embodiment, typical HTTP requests are possible, including GET, PUT, POST, and DELETE requests.

Thus, in one embodiment, the request from the user includes multiple options or flags that indicate specifics of the requested development environment, such as server names, application versions, or other variables. The options or flags may be set as variables within the request to the RESTful API. The request may also include authentication details, such as user names or passwords. Further, in one embodiment, the request from the user may include a reference to a desired template for the development environment, or an indication of a desired data center for the development environment. For example, if the data analysis application requires access to data housed in a particular data center, the requesting user may indicate that the development environment should be hosted on that data center. In one embodiment, the request is received over network 120 by development environment deployment manager 130. The request may take the form of an object, with multiple sub-objects within the request object for various aspects of the requested development environment. Thus, as will be described herein, a request object to the API provided by the development environment deployment manager 130 may include multiple sub-object requests to different APIs.

The method 200 then continues to block 204, where the request is evaluated to identify a stored template appropriate for the requested development environment. In one embodiment, as described above, development environment deployment manager 130 evaluates the request to determine a template stored in database 135 which is appropriate for the requested development environment. For example, the request may reveal that the requested development environment should be an OpenStack environment, in which case, an appropriate template is identified. Additionally, evaluation of the request may reveal that a certain version of a component of the development environment is required. For example, the requested development environment may require version 2 of a database server, while version 3 may be the most current version. Different templates may also use different operating systems or again, different versions of operating systems. A specification of an operating system may be based on an explicit variable in the request from the user, or may be determined based on other factors of the user's request. Based on such evaluations, the development environment deployment manager 130 may identify a stored template for the request. In one embodiment, the identification or determination of a stored template appropriate for the requested development environment is dependent on an organizational unit associated with the requesting user. For example, a particular organizational unit may require OpenStack development environments only, or may require particular configurations for their development environments. In one embodiment, the organizational unit information may be passed within a field to determine a stored template for the requested development environment. In one embodiment, the request object received from the user is converted into an internal format for use by the development environment deployment manager 130. Such a conversion allows changes to the internal request object, without external requesting users having to change their request objects.

In one embodiment, evaluating the request at block 204 includes determining an appropriate version of an application programming interface (API) for creation of a component of the requested development environment, based on the request. For example, a sub-object within the request object may be intended for a particular version of an API. One potential complication present in distributed systems and software packages is that versions of software, and in particular, versions of APIs, change frequently, but software dependent on those APIs is not necessarily updated in correspondence with the changes to the API. This may lead to issues if the newest version of the API expects a request with a specific number of fields or field configuration, but the software is written with a previous version of the API in mind having a different number of fields or configuration.

Additionally, issues may arise when an expected response object has a certain number of fields or configuration, but a different number of fields or configuration is actually returned. Such changes effectively break the software package requiring use of that API. Typically, API version changes are handled by modifying the URL to the API to a new version of the API (e.g., for a database connection API, the URL may be modified from a URL including "/v2/" to a URL including "/v3/"), but such changes require all software packages dependent on that API to reflect the changed API, which is intrusive to software developers.

Accordingly, in one embodiment, the development environment deployment manager 130, or another component of the system 100, may determine which version of a particular API a request is intended for, and may utilize that version of the API to process the request. In one embodiment, the development environment deployment manager 130 does so by examining the response object a call to an API is expecting. The response object the call is expecting may represent what a parser is expecting to receive to further process the response object. Based on the evaluation of that response object, the development environment deployment manager 130 uses an appropriate version of an API that corresponds to that response object. For example, if the response object expects three variables having particular names, the development environment deployment manager 130 may select an API version that provides such a response object. In one embodiment, the development environment deployment manager 130 selects the newest version of the API that would provide such a response object.

Thus, as depicted in FIG. 2, block 204 may include constituent steps beginning at block 204-1, where headers in the request representing a response object are evaluated to determine an API version for a first requested component of the development environment. For example, the variables expected in the response object, including the names of the variables and the number of variables in the response object, may be evaluated to determine a correct API version corresponding to the response object. Based on the evaluation, at block 204-2, an appropriate version of the API component is identified, and at block 204-3, an appropriate template or set of templates for the version of the API component are identified. In one embodiment, steps 204-1 through 204-3 may be repeated for each component of the requested development environment to determine the API version of each component, and to determine the correct template for the requested development environment.

In one embodiment, the attributes of a request or call to an API are used at block 204-1 to determine the version of the API to be used. For example, if three variables are included in a request to an API, a first version of the API may be used, whereas if four variables are included in a request to an API, a second version of the API may be used.

In one embodiment, the development environment deployment manager 130 provides a service catalog to requesting users, which lists all versions of all APIs available in the system, and information regarding request objects and response objects for each API and each version of that API. In addition, the service catalog may provide version information for each version of the overall request object for the development environment deployment manager 130 API, and the versions of constituent APIs within each version of the overall request object. In one embodiment, the overall request object version does not change if data fields are added to a constituent API, but only when data fields may be deleted or re-ordered/reconfigured.

In one embodiment, templates are initially created after a successful first deployment of a development environment. After a development environment is created, it can be converted into a template which can be later used by the development environment deployment manager 130 to create further development environments upon request from users. In one embodiment, individual virtual machines that constitute the development environment are imaged and used as portions of the template which can be combined to create a template for a development environment. While the initial set up of the template and its constituent virtual machines may be time consuming, later deployments of development environments based on the template may be provided quickly.

The method 200 then continues to block 206, where an instruction sequence is generated, based on the determined template, to create the requested development environment. In one embodiment, the instruction sequence includes multiple instructions to be executed by other servers, such as server 142, 146, 152, or 156, to set up one or more virtual machines with various configuration parameters as required by the requested development environment. Thus, in one embodiment, instructions in the instruction sequence may include a call to an application programming interface for the virtual machine host or hypervisor on the server 142, 146, 152, or 156. In one embodiment, the instruction sequence may be broken down into atomic events, each of which includes instructions. Further, the instruction sequence may specify an order for each atomic event. The order may be used to ensure that a later task or set of instructions does not execute before another set of instructions upon which that later task depends. Thus, for example, a set of instructions which cause a virtual machine to connect to a shell server may not execute before that shell server is fully set up on a separate virtual machine. In one embodiment, events may be reused in other templates, as will be further described herein.

In one embodiment, portions of, or the entirety of, the instruction sequence, may be represented as a state machine diagram, in which each instruction or event in the sequence is represented as an individual state. An event may include multiple individual instructions. Some events, for example, require up to 30 or more individual instructions. As one example, a reboot sequence may be considered an event which includes multiple instructions (e.g., commit all open work, terminate all running processes, restart machine). Similarly, installation of an operating system may be considered an event which includes multiple instructions. Upon completion of an instruction or event, the visual representation of the state may be modified to indicate success or failure of that state. For example, success of the state may be represented in green, a caution condition may be represented in yellow, and an error or failure may be represented in red. The state machine diagram may also include connectors originating from or terminating at events, which may represent dependencies within the sequence of events.

Figure 3:
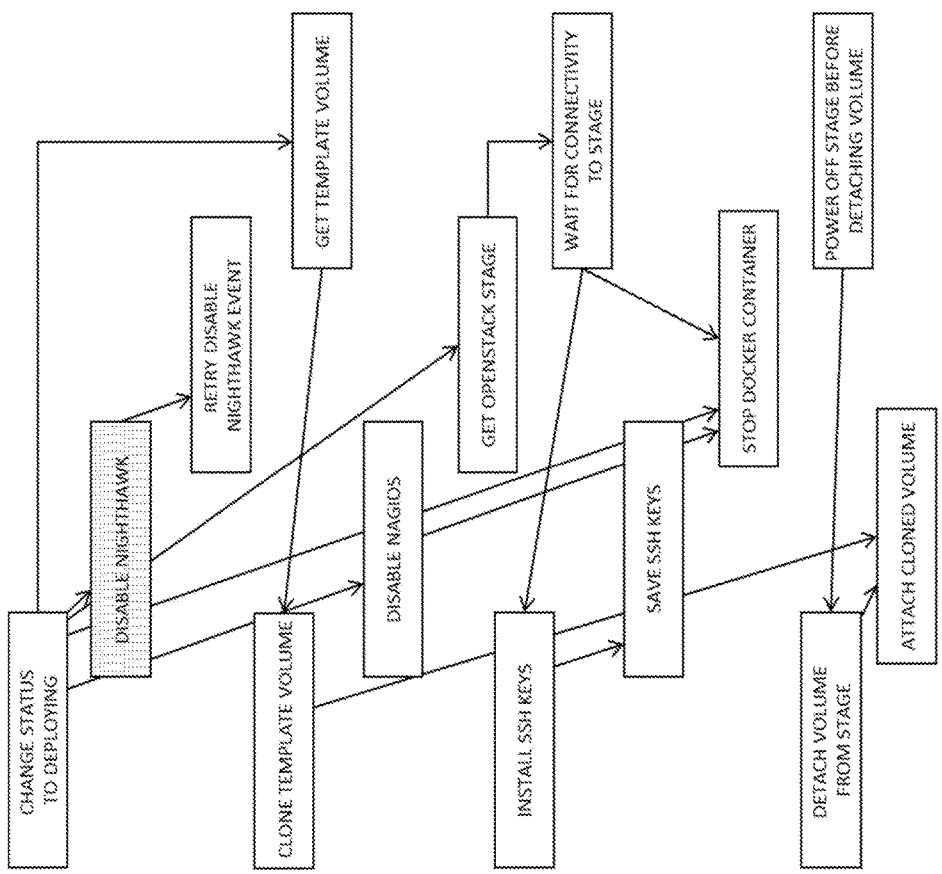
FIG. 3 is an example of a state machine diagram in accordance with one or more embodiments.

Thus, in the example above, the establishment of the shell server may be represented as one event in the state machine diagram, while the connection to the shell server may be represented as a second event in the state machine diagram. A connector may originate at the establishment event, terminating at the connection event. The development environment deployment manager 130 may generate and continually update the state machine diagram. An example of such a state machine diagram is depicted in FIG. 3. In FIG. 3, shaded boxes indicate a failed event, which may be represented in red if the state machine diagram is in color.

In one embodiment, the state machine diagram may be based on a JSON file that defines the individual steps or elements of the state machine for an instruction sequence, the dependencies of events upon other events, and other data for the state machine. The development environment deployment manager 130 may include a framework to generate the state machine diagram based on the JSON file. Additionally, the JSON file may include conditional events and logic.

In one embodiment, an interpreter or parser within the development environment deployment manager 130 may generate the state machine diagram based on the JSON file. Upon receiving an updated status of each event within the JSON file, the interpreter or parser may update the state machine diagram with the corresponding status for the event. In one embodiment, the state machine diagram may be updated in real-time whenever an individual event has an updated status. In one embodiment, the state machine diagram is updated periodically (e.g., every 15 seconds or at another time interval). Thus, for example, every 15 seconds, the development environment deployment manager 130 may determine the status of each event in the JSON file and appropriately update the state machine diagram.

Individual events within the state machine can be cancelled, paused, configured to respond based on an error condition, or perform other tasks. In one embodiment, the state machine diagram generated by the development environment deployment manager 130 is interactive. Thus, for example, each event represented on the state machine diagram (such as the state machine diagram presented in FIG. 3) can be cancelled, paused, restarted, or set to another state, based on a user's interaction with the state machine diagram using a keyboard, mouse, or other input device.

In one embodiment, each event in the JSON file for the state machine may be an individual JAVA class. In one embodiment, each event in the state machine begins execution as early as possible. That is, if an event does not depend on the completion of another event, it begins as soon as the state machine itself begins execution. If an event does depend on the completion of another event, it fires or executes as soon as that first event completes. Additionally, as described above, pointers or references to events can be used within the state machine, such that a JSON file for one workflow or set of events can reference other flows whether in whole or in part. Additionally, events may be able to pass variables and arguments from one event to another for data sharing purposes and for dependencies.

In one embodiment, events and instructions for a particular request may be assigned a task identifier which may be used by the development environment deployment manager 130 to track the progress of a request, and to generate the state machine diagram and update a task object corresponding to the identifier with data for the requested development environment. Such a task identifier and object may be a central point of information for the system to track status and identify actions to be taken. The task identifier may also be used by users to query the development environment deployment manager 130 for the status of the deployment of their development environment.

Additionally, the task identifier may be used for logging purposes. In one embodiment, a logging framework may be used to assist administrative users and end users with diagnosing and remedying errors. For example, typical RESTful APIs only provide an error message and error code when an exception or error is encountered. The RESTful APIs in accordance with the embodiments described herein provide additional contextual information to facilitate error handling, debugging, and other tasks with additional insight into the causes and potential solutions of such errors. In one embodiment, each log entry in a log may have an error name, an application identifier, one or more flags or tags characterizing the log entry, a description of the log entry, and remediation instructions. An initial set of error names may be provided by administrative users, but other users may add error names when new errors occur which do not fit into previously established error names. Log entries may also reference particular lines of code in a software package that encounter errors, and may provide debugging instructions and possible solutions to those errors. For example, log entries may reproduce a chain or sequence of calls to methods to help identify the events or instructions that occurred or executed before and after the error. In one embodiment, the errors occurred at each method call may be logged. Thus, each sequence may be unique for a given error which is encountered.

Each log entry may further be associated with contact information (e.g., e-mail addresses) of administrative members who should be notified of such a log entry or who may be able to remedy an error. Log entries may be presented and viewed in a user interface with a table format, and users may adjust the width of columns and the columns presented depending on their desired view. Further, a logging framework may be utilized that allows administrative users or other users to filter log entries by event, thread, class, subtask, or other criteria. Further, log entries in a logging framework in accordance with embodiments described herein may be associated with other contextual information, such as a server identifier and event identifier.

In one embodiment, a logging framework in accordance with embodiments operates on log server 160, which is coupled to development environment deployment manager 130. Log server 160 may store log entries using a database backend. In one embodiment, if the database backend for the log server 160 is unavailable or offline, for example, if an outage occurs, the log server 160 may write log entries to a temporary file, and then transmit the log entries in the temporary file to the database backend when the database backend becomes available again. In one embodiment, the log server 160 and logging framework are based on a Simple Logging Façade for JAVA (SLF4J) logging API.

In one embodiment, the logging framework may assist in remediating errors encountered within the process of deploying a development environment. For example, log entries associated with a particular event in a template may be associated with remediation instructions, including executable commands, which can be executed when an error occurs to attempt to remedy the encountered error. In one embodiment, the remediation instructions can be copied and pasted into a terminal window or shell window for execution. In one embodiment, the development environment deployment manager 130 may be self-healing, and may automatically execute the remediation instructions upon encountering an error. In one embodiment, the development environment deployment manager 130 requests user confirmation from the requesting user or an administrative user before executing the remediation instructions.

In one embodiment, the state machine diagram generated by development environment deployment manager 130 or another component of system 100 can be used as a graphical user interface to view relevant log entries, for example, log entries stored by log server 160. Thus, for example, as individual events within an instruction sequence execute, and their states are updated within a state machine diagram, a user may be able to click on the graphical representation of the event within the state machine diagram to thereafter be presented with log entries related to that event. Thus, for example, if an event in the state machine diagram has an error condition and is colored red, a user or administrator may immediately be able to view a log entry for that error event, view remediation instructions, execute remediation instructions, or perform other tasks.

Additionally, groups of instructions representing an event may be stored as events in the state machine, and copied and reused in other state machine flows to reduce or eliminate the need to create future state machine flows from scratch. For example, the reboot sequence mentioned above may include multiple instructions and a large amount of code. If the reboot sequence is likely to be reused by other state machine flows, it can be saved as an event and added easily to a state machine flows or instruction sequence. In one embodiment, the reboot sequence instruction set or event is included in an instruction sequence or state machine flow using a pointer to the instruction set or event.

Method 200 then continues to block 208, where the development environment deployment manager 130 transmits one or more of the instructions in the instruction sequence to a plurality of virtual machine hosts. In one embodiment, the instructions are transmitted over a network to a data center in which, for example, servers 142 and 146 are resident. In one embodiment, instructions may include calls to one or more application programming interfaces of the virtual machine hosts executing on the servers, which may cause, in one embodiment, creation of virtual machines. Once a virtual machine is created on the virtual machine hosts, the virtual machines may further be issued commands to install certain applications or software (e.g., web server software), execute services (such as database services), mount and unmounts disks or storage volumes, install authentication keys, disable services, clone storage volumes, connect installed applications or software to other virtual machines or resources over a network, or other tasks.

In one embodiment, after a particular instruction or set of instructions for an event is transmitted to a virtual machine host and executed, the development environment deployment manager 130 receives an update or notification on the success or failure of that instruction or event. In response to the receipt of an update, the development environment deployment manager 130 may determine whether the instruction or event succeeded, and may update a state machine diagram as described above. Further, in response to the update or notification, the development environment deployment manager 130 may attempt to repeat an instruction or event which failed. In one embodiment, the development environment deployment manager 130 waits a certain amount of time before retrying the event. Additionally, in one embodiment, if the event or instruction fails because of a dependency on another event, the development environment deployment manager 130 may wait until that other event successfully completes before retrying the failed event. Advantageously, the user requesting the development environment need not manually cause the event to be retried; rather, the development environment deployment manager 130 tracks the progress of the development environment deployment and intelligently repeats instructions or events as necessary, without user involvement.

In one embodiment, state machine logic in the development environment deployment manager 130 may allow problematic events or groups of instructions to be paused and resumed at a later time, for example, after a failure condition has been remedied.

In one embodiment, instructions, sets of instructions, or events may be transmitted to physical servers to instantiate various services, as opposed to virtual machine hosts executing on physical servers. For example, certain software packages may experience better performance on bare metal (i.e. physical) hardware without having to execute within a virtual machine. In one embodiment, the development environment deployment manager 130 may intelligently determine that a constituent software package within the requested development environment should execute on a physical server, and transmit instructions accordingly.

Method 200 then continues to block 210, where the development environment deployment manager 130, upon successful creation of the development environment (i.e., upon successful completion of each instruction or event), returns a response to the requesting user. In one embodiment, the response includes access information for the created development environment, such as host names, usernames, passwords, other authentication information, IP addresses, SSH keys, and other information which can be used by the requesting user to access the created development environment.

In one embodiment, the APIs exposed by the development environment deployment manager 130 to create a development environment can also be used to update aspects of a created development environment. For example, a user may submit a request using the development environment deployment manager's API to add, delete, or overwrite administrative users of the development environment. Additionally, e-mails or contact information for users can be added, deleted, or overwritten, also using the development environment deployment manager API. Further, the use of other systems can be modified using an API request; for example, a load balancer may be activated or deactivated, or a load balancer may be assigned a master role, based on an API request.

In some embodiments, the response from the API may include various data including details of the created development environment, which can be used by the requesting user depending on their needs. For example, the response may include the hard disk size of created virtual machines, test URLs, source stages, names for the development environment or constituent virtual machines thereof, metadata for templates used, package details for software packages which were installed, results of tests of the development environment, error codes, time of creation, task identifiers, server names, etc.

In one embodiment, each request to the API provided by or exposed by the development environment deployment manager 130 returns a corresponding response (which may be in XML or JSON). For example, a request may be made to stop certain services, using an API request to a method class, which includes the names of the services to be stopped. The API may then provide a response that indicates success or failure of the request, and additional information related to the request. Services may be started in a similar manner, using an API request, and a response may also be provided.

The API may also provide responses to the requesting user after completion of each stage of the deployment process. Thus, for example, after a particular virtual machine is instantiated and configured, the development environment deployment manager 130 may provide a response to the user indicating successful completion of that stage of the process. Such a response may include an indication that the virtual machine passed or failed a unit test, a hostname for the virtual machine, a domain name for the virtual machine, memory and hard drive size information, a number of processors for the virtual machine, IP addresses, and other information.

Further, the API may support other requests and provide appropriate responses. For example, the API may receive a request from a user inquiring about the properties of a given virtual machine, and in response, the API may return the name of the virtual machine, the number of processors, the memory size, and the hard disk size of the virtual machine. Status requests and responses may also be provided by the API.

Other requests supported by the API may include a request to reconfigure a proxy, or reboot or power cycle a virtual machine. The API may also support a request for options currently enabled or disabled on a development environment or constituent virtual machines thereof. Responses as to the status of an event, the status of a pool of virtual machines, or the status of a location of virtual machines may also be supported in response to corresponding requests.

Additionally, a request to deploy packages may be supported by the development environment deployment manager API. The request may include options such as a deployment type, a build identification, a label for the request, a manifest name for packages, one or more package names, whether the package should be deployed on a clean stage, and other options. In response, the API may provide a completion status with a job identifier, a URL for details of the job, a start and end time, a percentage of completion, a pointer to logging information, and other responsive information.

Other requests may include a request to clone a database, or a request to authenticate a user. Requests to the API may also include a request to change the status of a stage of an API request, a request to clone a stage of an API request or create a new stage, a request to clone a task within an API request, a request to create a database, and a change to a template.

Thus, systems and methods for deploying development environments have been described that provide for simpler deployment of such environments while abstracting details of development environment creation from end users. The systems and methods of the present disclosure provide substantial benefits over conventional solutions by, for example, handling multiple versions of APIs without requiring user involvement, and retrying individual events within a state machine flow without requiring user intervention.

Figure 4:
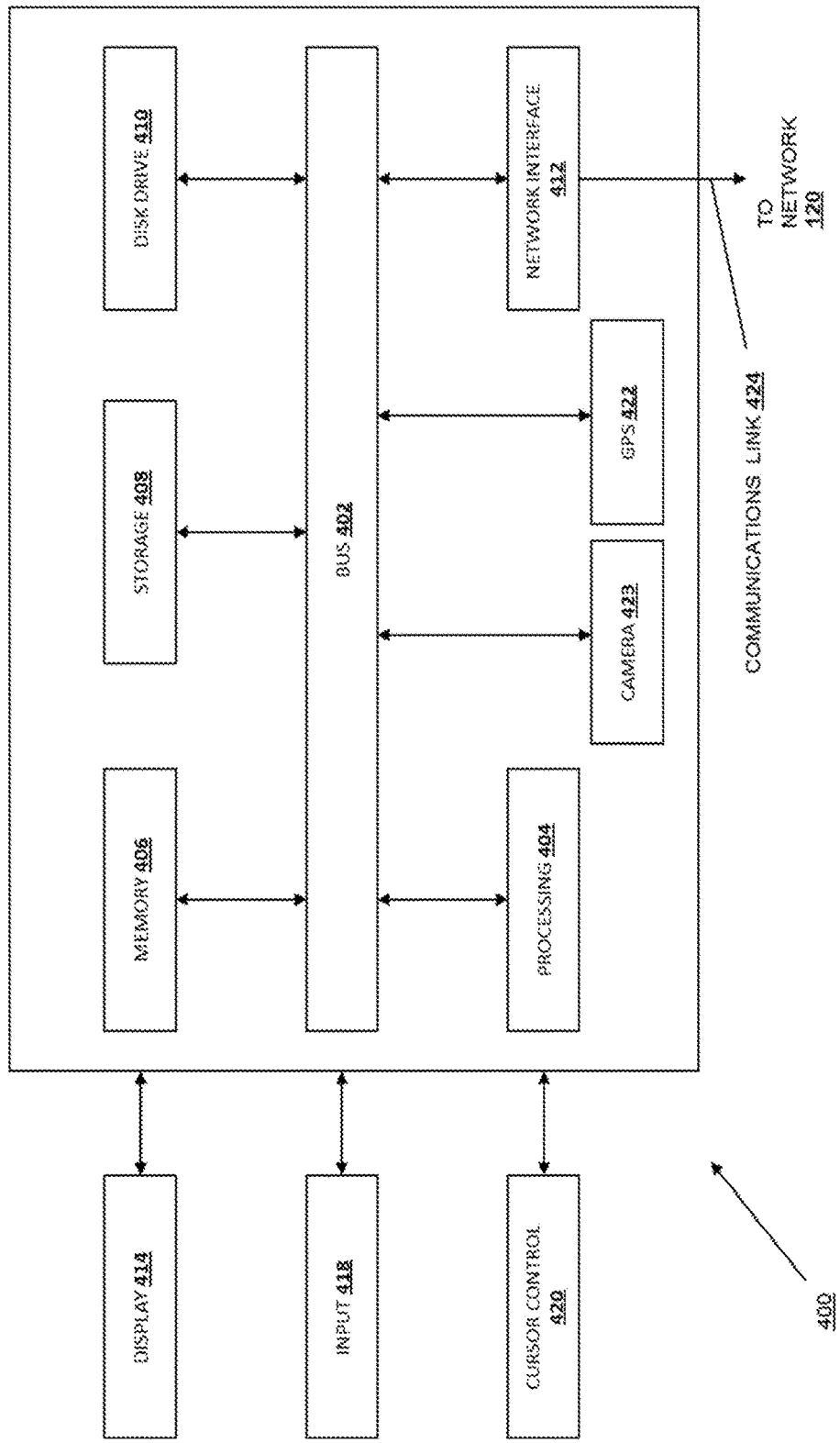
FIG. 4 is a schematic view illustrating an embodiment of a computing device, such as a development environment deployment manager system.

Referring now to FIG. 4, an embodiment of a computer system 400 suitable for implementing, for example, the client device 110, development environment deployment manager 130, servers 142, 146, 152, 152, log server 160, test servers 170, and terminal servers 172, is described. It should be appreciated that other devices utilized by developers, users, administrative users, customers, merchants, payment service providers, and/or system providers in the system discussed above may be implemented as the computer system 400 in a manner as follows.

In accordance with various embodiments of the present disclosure, computer system 400, such as a computer and/or a network server, includes a bus 402 or other communication mechanism for communicating information, which interconnects subsystems and components, such as a processing component 404 (e.g., processor, micro-controller, digital signal processor (DSP), etc.), a system memory component 406 (e.g., RAM), a static storage component 408 (e.g., ROM), a disk drive component 410 (e.g., magnetic or optical), a network interface component 412 (e.g., modem or Ethernet card), a display component 414 (e.g., CRT or LCD), an input component 418 (e.g., keyboard, keypad, or virtual keyboard), a cursor control component 420 (e.g., mouse, pointer, or trackball), a location determination component 422 (e.g., a Global Positioning System (GPS) device as illustrated, a cell tower triangulation device, and/or a variety of other location determination devices known in the art), and/or a camera component 423. In one implementation, the disk drive component 410 may comprise a database having one or more disk drive components.

In accordance with embodiments of the present disclosure, the computer system 400 performs specific operations by the processor 404 executing one or more sequences of instructions contained in the memory component 406, such as described herein with respect to the client devices 110, servers 152 and 162, application router 140, local traffic managers 154 and 164, and/or metadata stores 156 and 166. Such instructions may be read into the system memory component 406 from another computer readable medium, such as the static storage component 408 or the disk drive component 410. In other embodiments, hard-wired circuitry may be used in place of or in combination with software instructions to implement the present disclosure.

Logic may be encoded in a computer readable medium, which may refer to any medium that participates in providing instructions to the processor 404 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 410, volatile media includes dynamic memory, such as the system memory component 406, and transmission media includes coaxial cables, copper wire, and fiber optics, including wires that comprise the bus 402. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 400. In various other embodiments of the present disclosure, a plurality of the computer systems 400 coupled by a communication link 424 to the network 120 (e.g., such as a LAN, WLAN, PTSN, and/or various other wired or wireless networks, including telecommunications, mobile, and cellular phone networks) may perform instruction sequences to practice the present disclosure in coordination with one another.

The computer system 400 may transmit and receive messages, data, information and instructions, including one or more programs (i.e., application code) through the communication link 424 and the network interface component 412. The network interface component 412 may include an antenna, either separate or integrated, to enable transmission and reception via the communication link 424. Received program code may be executed by processor 404 as received and/or stored in disk drive component 410 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A development environment deployment system, comprising:
    a non-transitory memory storing a plurality of templates for creation of a plurality of development environments; and
    one or more hardware processors coupled to the non-transitory memory and configured to read instructions to cause the system to perform operations comprising:
        receiving, from a user, a request to create a first development environment, wherein the plurality of development environments comprises the first development environment;
        evaluating the request to identify a stored template from the plurality of templates for creating the first development environment, wherein evaluating the request comprises evaluating a header in the request representing a response object to determine an application programming interface version associated with a component of the first development environment based on at least one of a number of variables included in the response object or a name of a variable in the response object;
        parsing the identified stored template to identify a plurality of events for creating the first development environment according to the identified stored template, wherein each event is associated with a plurality of executable instructions;
        generating an interactive graphical depiction representing deployment statuses of the plurality of events for display on a display device coupled to the development environment deployment system, wherein at least a portion of the interactive graphical depiction is responsive to a user interaction with the interactive graphical depiction using an input device;

receiving an updated status of a first event in the plurality of events from a first virtual machine host coupled to the development environment deployment system, the first virtual machine host executing one or more executable instructions associated with the first event; and modifying, in real-time, the interactive graphical depiction based on the updated status of the first event.

2. The development environment deployment system of claim 1, wherein parsing the identified stored template includes identifying a dependency between the first event and a second event, and wherein the generated interactive graphical depiction includes a graphical representation of the identified dependency.

3. The development environment deployment system of claim 1, wherein the operations further comprise:

receiving an updated status of a second event in the plurality of events from a second virtual machine host coupled to the development environment deployment system, wherein the updated status of the second event is an error status;

modifying the interactive graphical depiction to reflect the error status of the second event; and in response to receiving the error status of the second event, transmitting the plurality of executable instructions associated with the second event to the second virtual machine host to retry performing the second event.

4. The development environment deployment system of claim 1, wherein the plurality of executable instructions associated with the first event include a call to an application programming interface of the first virtual machine host.

5. The development environment deployment system of claim 1, wherein each stored template is formatted in a JavaScript object notation format.

6. The development environment deployment system of claim 1, wherein modifying the interactive graphical depiction includes changing a color of a portion of the graphical depiction corresponding to the first event.

7. The development environment deployment system of claim 1, wherein modifying the interactive graphical depiction includes shading a portion of the interactive graphical depiction corresponding to the first event.

8. A method for graphically depicting deployment of a development environment, comprising:

receiving, from a user over a network, a request to create a development environment;

evaluating, by a development environment deployment system, the request to identify a stored template for creating the requested development environment, wherein evaluating the request comprises evaluating a response object represented in the request to determine an application programming interface version associated with a component of the requested development environment based on at least one of a number of variables included in the response object or a name of a variable in the response object;

parsing, by the development environment deployment system, the identified stored template to identify a plurality of events for creating the development environment according to the identified stored template, wherein each event is associated with a plurality of executable instructions;

generating an interactive graphical depiction representing the plurality of events for display on a display device coupled to the development environment deployment system, wherein at least a portion of the interactive graphical depiction is responsive to a user interaction with the interactive graphical depiction from an input device;

receiving an updated status of a first event in the plurality of events from a first virtual machine host coupled to the development environment deployment system, the first virtual machine host executing one or more executable instructions associated with the first event; and modifying, in real-time, the interactive graphical depiction based on the updated status of the first event.

9. The method of claim 8, wherein parsing the identified stored template includes identifying a dependency between the first event and a second event, and wherein the generated interactive graphical depiction includes a graphical representation of the identified dependency.

10. The method of claim 8, further comprising:

receiving an updated status of a second event in the plurality of events from a second virtual machine host coupled to the development environment deployment system, wherein the updated status of the second event is an error status;

modifying the interactive graphical depiction to reflect the error status of the second event; and in response to receiving the error status of the second event, transmitting the plurality of executable instructions associated with the second event to the second virtual machine host to retry performing the second event.

11. The method of claim 8, wherein the plurality of executable instructions associated with the first event include a call to an application programming interface of the first virtual machine host.

12. The method of claim 8, wherein each stored template is formatted in a JavaScript object notation format.

13. The method of claim 8, wherein modifying the interactive graphical depiction includes changing a color of a portion of the graphical depiction corresponding to the first event.

14. The method of claim 8, wherein modifying the interactive graphical depiction includes shading a portion of the graphical depiction corresponding to the first event.

15. A non-transitory machine-readable medium having stored thereon machine-readable instructions executable to cause a machine to perform operations comprising:

receiving, from a user over a network, a request to create a development environment;

evaluating the request to identify a stored template for creating the requested development environment, wherein evaluating the request comprises evaluating a response object represented in the request to determine an application programming interface version associated with a component of the requested development environment based on at least one of a number of variables included in the response object or a name of a variable in the response object;

parsing the identified stored template to identify a plurality of events for creating the development environment, wherein each event is associated with a plurality of executable instructions;

generating an interactive graphical depiction representing deployment statuses of the plurality of events for display on a display device coupled to the development environment deployment system, wherein at least a portion of the interactive graphical depiction is responsive to a user interaction with the interactive graphical depiction using an input device;

receiving an updated status of a first event in the plurality of events from a first virtual machine host coupled to the development environment deployment system, the first virtual machine host executing one or more executable instructions associated with the first event; and modifying, in real-time, the interactive graphical depiction to reflect the updated status of the first event.

16. The non-transitory machine-readable medium of claim 15, wherein parsing the identified stored template includes identifying a dependency between at least two events in the plurality of events, and wherein the generated interactive graphical depiction includes a graphical representation of the identified dependency.

17. The non-transitory machine-readable medium of claim 15, wherein the operations further comprise:

receiving an updated status of a second event in the plurality of events from a second virtual machine host coupled to the development environment deployment system, wherein the updated status of the second event is an error status;

modifying the interactive graphical depiction to reflect the error status of the second event; and in response to receiving the error status of the second event, transmitting the plurality of executable instructions associated with the second event to the second virtual machine host to retry performing the second event.

18. The non-transitory machine-readable medium of claim 15, wherein at least one event in the plurality of events is associated with an executable instruction comprising a call to an application programming interface of the first virtual machine host.

19. The non-transitory machine-readable medium of claim 15, wherein each stored template is formatted in a JavaScript object notation format.

20. The non-transitory machine-readable medium of claim 15, wherein modifying the interactive graphical depiction includes changing a color of a portion of the graphical depiction corresponding to the first event.

* * * * *